United States Patent Office 3,523,582
Patented Aug. 11, 1970

3,523,582
INHIBITION OF SCALE DEPOSITION DURING SECONDARY RECOVERY
Richard S. Fulford, Tulsa, Okla., assignor to Cities Service Oil Company, Tulsa, Okla., a corporation of Delaware
No Drawing. Filed Sept. 26, 1968, Ser. No. 762,969
Int. Cl. E21b 43/20
U.S. Cl. 166—305
11 Claims

ABSTRACT OF THE DISCLOSURE

A dilution fluid is injected into a production wellbore through the annulus between the production tubing and the wellbore casing during the secondary recovery of oil by waterflooding. The dilution fluid is compatible with the water recovered at the production wellbore and is injected into the production wellbore in an amount sufficient to reduce the amount of supersaturation of calcium sulfate to less than about 400 mg./l. The rate of deposition of the calcium sulfate from the production waters is thereby reduced sufficiently so as to permit the waters to be pumped from the production wellbore before appreciable quantities of calcium sulfate scale are deposited in the production wellbore and in the vicinity thereof. The dilution fluid may be either fresh water or a solution in water salts tending to increase the solubility, i.e. decrease the amount of supersaturation, of the calcium sulfate in the production waters. Sodium chloride, potassium chloride, sodium nitrate and potassium nitrate are among the salts that may be employed in the dilution fluid in order to increase the solubility of calcium sulfate and thus to reduce the total amount of dilution fluid needed in order to achieve the desired reduction in this amount of supersaturation in the production waters.

BACKGROUND OF THE INVENTION

Field of the invention

This invention relates to the secondary recovery of petroleum by waterflooding. More particularly, it relates to the inhibition of the deposition of scale in the vicinity of the production wellbore.

Descrpition of the prior art

In the secondary recovery of petroleum from the subterranean calcium sulfate-containing reservoirs by waterflooding, production is often hindered by the deposition of calcium sulfate scale in the vicinity of the production wellbore and in the wellbore itself. As the flood water passes through the reservoir under high pressure, it tends to dissolve appreciable quantities of calcium sulfate. As the flood water approaches the lower pressure region in the vicinity of the production wellbore, however, the solubility of the calcium sulfate decreases, thereby causing the precipitaton of calcium sulfate scale. As this scale accumulates during the waterflooding operation, the flow of fluids into the production wellbore is impeded, often to such an extent that productions essentially terminated.

In the past, considerable attention has been given to the development of techniques for removing scale deposits that have impeded secondary recovery operations. These techniques have included both physical and chemical scale removal treatments. For example, drilling the deposited scale from the wellbore has been proposed. This procedure, however, is both expensive to perform and results in a considerable loss in production time. In addition, scale that has been deposited in the reservoir itself cannot be removed in this manner. In another physical solution to this problem, it has been proposed that the reservoir be fractured by hydraulic means so as to permit the reservoir fluids to bypass the scale formed in the reservoir.

The various known chemical treatments are also intended to remove scale after it had formed in the reservoir. Sodium and potassium hydroxides, chelating agents, such as ethylenediaminetetraacetic acid (EDTA) and two stage treatments employing hydroxides followed by acids have been used. The calcium sulfate scale, however, is not readily removed by these techniques. In addition, the treatments are relatively expensive and, as with the physical treatments referred to above, result in a significant loss in production time.

It has also been proposed to employ various chemicals to prevent the formation of scale. Such chemicals are generally placed in the wellbore or forced into the oil reservoir in order to prevent calcium sulfate scale from precipitating. When the chemicals have been placed in the wellbore, they have not effectively prevented scale, perhaps as a result of being spent or excessively diluted prior to reaching the producing zone where the scale problem exists. In order to be effective, chemicals forced into the reservoir must reach the zones of the reservoir in which scaling occurs. Since at least a portion of the chemicals are undoubtedly forced into regions where scaling does not occur, and are therefore wasted, this treatment is more expensive and less effective than desired. In a similar solution, it has been proposed that fresh water be forced into the reservoir in order to reduce the concentration of calcium sulfate to a point below the saturation point of the calcium sulfate so as to prevent the precipitation of calcium sulfate scale. Since adequate supplies of fresh water is not always available at economic costs, this method of scale prevention is likewise not entirely satisfactory as a solution to the problem in question.

It is an object of this invention, therefore, to provide an improved waterflooding technique for use in calcium sulfate-containing reservoirs.

It is another object of this invention to provide a method for controlling the deposition of scale so as to enhance the secondary recovery of oil by waterflooding.

It is a further object of this invention to provide an economical means for minimizing the adverse effects of the deposition of calcium sulfate scale.

With these and other objects in mind, the invention is hereafter set forth in detail, the novel features thereof being pointed out in the appended claims.

SUMMARY OF THE INVENTION

The rate of scale deposition is impeded by injecting a dilution fluid into the production wellbore and the reservoir area in the vicinity thereof so as to reduce the amount pf calcium sulfate supersaturation to less than about 400 mg./l. The amount of scale formed in the wellbore and in the vicinity thereof during the residence time in which the production fluids are present therein is thus greatly reduced. Waterflooding operations may be continued for considerably increased periods of time, or even carried to completion, prior to the accumulation of scale in sufficient quantities to impede the flow of production fluids into the production wellbore.

The dilution fluid should be compatible with the production waters and thus should result in a decrease in the amount of calcium sulfate supersaturation in said production waters. Fresh water or a solution of sulfate solubility-increasing salts may be conveniently employed. By employing salts of this type, such as sodium and potassium chlorides and nitrates, the total amount of dilution fluid needed in order to achieve the desired reduction in calcium sulfate supersaturation may be reduced.

DETAILED DESCRIPTION OF THE INVENION

As indicated above, the present invention does not require the dilution of the production waters to the point where the concentration of calcium sulfate is below the saturation point and the precipitation of the calcium sulfate is precluded. Rather the present invention calls for the addition of a sufficient quantity of dilution fluid so as to reduce the supersaturation of calcium sulfate to generally below about 400 mg./liter. By diluting the production fluids to this extent, the rate of calcium sulfate deposition will be sufficiently reduced so as to significantly lessen the problems caused by the formation of calcium sulfate scale. An even more significant reduction may be achieved by further reducing the amount of supersaturation to less than about 100 mg./l .At this level of supersaturation, the deposition of scale is effectively minimized within the typical residence time of the production fluids in the vicinity of the wellbore and in the wellbore itself before being recovered at the surface.

The dilution fluid is conveniently added to the production fluids by injecting the dilution fluid down the annulus of the production well between the production tubing and the wellbore casing. The amount of dilution fluid necessary for the desired reduction in supersaturation will vary depending upon the particular reservoir characteristics and operating conditions. The amount of dilution fluid to be added can, however, readily be determined from a knowledge of the amount of calcium sulfate supersaturation prevailing in the production water in the vicinity of the wellbore, the amount of water in the producing zone in the vicinity of the wellbore and the saturation level of calcium sulfate under the existing conditions. The saturation level will depend upon such factors as the rservoir temperature and pressure conditions, and the like. The amount of production water in the vicinity of the production wellbore will depend upon the reservoir characteristics, the prevailing oil to water ratio, etc. The prevailing amount of calcium sulfate supersaturation can be determined with reasonable accuracy by those familiar with the particular waterflooding operation and its performance characeristics, including the amount of supersaturation of the waters as produced at the surface.

The dilution fluid employed to reduce the supersaturation of the calcium sulfate in the production waters should be compatible with the production waters. For purposes of this invention, a "compatible dilution fluid" is regarded as a fluid that, when added to the production waters as herein contemplated, will cause or otherwise result in a decrease in the amount of supersaturation of the calcium sulfate in the production waters. The dilution fluid may be fresh water that results in a reduction in supersaturation by diluting the amount of production water in the vicinity of the production wellbore. The use of oil as the dilution fluid would not be effective since it would not dissolve in water but would simply form a separate hydrocarbon level. The use of alcohols also would not be desirable since alcohols would tend to lower the solubility of the calcium sulfate causing an increase in scale formation.

The dilution fluid may also comprise a solution of salts in water. The salts employed should be, of course, those that result in an increase in the solubility of calcium sulfate and that will not themselves result in the formation of insoluble precipitates in the reservoir. By increasing the solubility of calcium sulfate, the presence of these salts results in a further reduction in the calcium sulfate supersaturation over and above the dilution effect of the accompanying water. The use of a salt solution in place of fresh water thereby permits a reduction in the amount of dilution fluid that must be employed in order to achieve a given reduction in the level of calcium sulfate supersaturation.

While a solution of any salts that is compatible with the production waters may be employed as the dilution fluid, the use of monovalent ion salts, such as sodium and potassium chloride and nitrates, and mixtures thereof, is generally the most convenient from a practical viewpoint. Other salts, such as magnesium chloride, may also be employed in the dilution fluid in order to achieve the desired reduction in calcium sulfate supersaturation. In general, salts containing a common ion with the calcium sulfate, i.e. either the $Ca^{+2}$ ion or the $So_4^{-2}$ ion, will result in a decrease in solubility and a consequent increase in supersaturation. Other ions, such as the $Na^{+1}$ ion and the $Cl^{-1}$ ion, will generally cause an increase in solubility and, consequently, a desired decrease in supersaturation. In many instances, the available dilution water will contain both salts that are desirable for purposes of this invention and those whose effect is in the opposite direction. It has been found, however, that the effect of solubility increasing salts such as sodium chloride is greater than that of solubility decreasing salts, e.g. sodium sulfate. It is within the scope of the present invention to employ a dilution fluid containing a mixture of such salts provided that the overall effect of the salts does not result in the dilution fluid being incompatible with the production waters. As indicated above, a compatible fluid is one that results in a decrease in the amount of calcium sulfate supersaturation.

Any convenient salt concentration may be employed in the dilution fluid of the present invention. In the case of naturally occurring sodium chloride solutions, the sodium chloride may be present in amounts ranging from about 0.1% to about 10% by weight of the solution, although brines having up to 20% by weight sodium cholride may also be available in some instances. Salt concentrations of about 0.5% are sometimes convenient when the salt solution is to be prepared, as are brines having from about 4.0% to about 5.0% by weight sodium chloride. With respect to other common salt solutions that may be employed, a salt concentration of from about 0.1 to about 5.0% by weight of said dilution fluid may conveniently be employed. While the amount of salt is not critical, the decrease in calcium sulfate supersaturation increases as the amount of salt in the dilution fluid is increased.

In runs intended to demonstrate the effectiveness of the inventive concept herein set forth, water supersaturated with calcium sulfate was diluted with various amounts of water of different salinities. Calcium sulfate scale crystals were placed with the diluted calcium sulfate supersaturated water and the rate of calcium sulfate precipitation was obtained by determination of the calcium content at various time intervals. The rate of scale deposition was decreased by the treatment with a dilution fluid and the overall effect in a 10 hour period equivalent to the typical residence time for the production waters in and in the vicinity of the wellbore is as set forth in the following table:

TABLE

| Percent Dilution Water Added | Percent Dissolved Salt in Dilution Water | | | | Amount of Calcium Sulfate Scale 10 Hours After Dilution (mg./l.) | Amount of Calcium Sulfate Over Saturation Level Immediately After Dilution (mg./l.) |
| --- | --- | --- | --- | --- | --- | --- |
| | NaCl | Na₂SO₄ | MgCl₂ | CaCl₂ | | |
| 0 | | | | | 620 | 1,100 |
| 9 | 0.49 | 0.49 | 0.03 | 0.03 | 500 | 900 |
| 25 | 0.49 | 0.49 | 0.03 | 0.03 | 65 | 350 |
| 25 | 4.47 | 0.49 | 0.03 | 0.03 | 0 | 100 |
| 32 | 0.49 | 0.49 | 0.03 | 0.03 | 0 | 0 |

As can be seen from the results of this table, the rate of calcium sulfate deposition during the time interval between the approach of the production water to the vicinity of the production wellbore and its recovery at the surface can be significantly decreased by the reduction in supersaturation called for by the present invention. The table also illustrates the reduction in the amount of dilution fluid that can be achieved by employing a higher concentration of salt in reducing the amount of supersaturation to a desired level. The table further illustrates the applicability of brines that contain calcium sulfate solubility decreasing salts, e.g. Na₂SO₄, in addition to the desired solubility increasing salts, provided, however, that the overall effect of the dilution fluid is to result in the desired decrease in calcium sulfate supersaturation.

The present invention represents a significant advance in the art of scale control during secondary recovery waterflooding operations. By providing a relatively simple and inexpensive control on the rate of calcium sulfate deposition in the vicinity of the production wellbore, the present invention essentially achieves the goals heretofore thought possible either by avoiding completely the possibility of scale deposition or by the many techniques previously proposed for removing the scale after it has impaired the flow of fluids into the production wellbore. The present invention, therefore, overcomes one of the most troublesome problems encountered in waterflooding operations.

Therefore, I claim:

1. A method for inhibiting the deposition of calcium sulfate scale in the vicinity of a production wellbore during secondary recovery of petroleum from subterranean reservoirs by waterflooding comprising injecting a dilution fluid into the production wellbore through the annulus between the production tubing and the wellbore casing during said secondary recovery, said dilution fluid being compatible with the water recovered at said wellbore and being injected in an amount sufficient to reduce the amount of supersaturation of said calcium sulfate to less than about 400 mg./l. in the vicinity of the production wellbore, whereby the rate of calcium sulfate deposition from the production waters in the vicinity of the production wellbore is reduced sufficiently so that said waters may be withdrawn from said production wellbore before appreciable quantities of calcium sulfate scale are deposited in or in the vicinity of the production wellbore.

2. The method of claim 1 in which the amount of calcium sulfate supersaturation is reduced to less than about 100 mg./l.

3. Method of claim 1 in which said dilution fluid comprises fresh water.

4. The method of claim 1 in which said dilution fluid comprises a solution of solubility-increasing salts in water, said salts tending to increase the solubility of calcium sulfate in the waters in the vicinity of the wellbore whereby a smaller quantity of dilution fluid may be employed in order to reduce the supersaturation of the calcium sulfate by the desired amount.

5. The method of claim 4 in which said solubility-increasing salts comprise monovalent ion salts.

6. The method of claim 5 in which said salts are taken from the group consisting of sodium chloride, potassium chloride, sodium nitrate, potassium nitrate and mixtures thereof.

7. The method of claim 6 in which said salt comprises sodium chloride.

8. The method of claim 7 in which the concentration of salt in the dilution fluid is within the range of from about 0.1 to about 10% by weight of said fluid.

9. The method of claim 8 in which the concentration of salt in the dilution fluid is about 0.5%.

10. The method of claim 8 in which the concentration of salt in the dilution fluid is between about 4.0 and 5.0% by weight of said dilution fluid.

11. The method of claim 6 in which said salts are present in an amount within the range of from about 0.1 to about 5.0% by weight of said dilution fluid.

References Cited

UNITED STATES PATENTS

| 239,417 | 3/1881 | Alfieri | 252—175 X |
| 2,395,260 | 2/1946 | Farmer et al. | 210—57 |
| 2,429,594 | 10/1947 | Case | 252—175 X |
| 2,947,690 | 8/1960 | Axelrad | 210—57 |
| 3,240,627 | 3/1966 | White | 252—8.55 X |
| 3,298,435 | 1/1967 | Schoenfeld et al. | 166—268 |

ERNEST R. PURSER, Primary Examiner

I. A. CALVERT, Assistant Examiner

U.S. Cl. X.R.

166—310